United States Patent [19]

Henry

[11] Patent Number: 4,669,303

[45] Date of Patent: Jun. 2, 1987

[54] TRUSTWORTHY BANK AND ANGLE OF ATTACK INDICATOR

[76] Inventor: Richard D. Henry, R.D. #1, Box 331-A, Clinton, Pa. 15026

[21] Appl. No.: 735,613

[22] Filed: May 20, 1985

[51] Int. Cl.⁴ .............................................. G01C 21/00
[52] U.S. Cl. ..................................... 73/178 R; 73/180
[58] Field of Search .................. 73/180, 178 R, 178 T

[56] References Cited

U.S. PATENT DOCUMENTS

| | | | |
|---|---|---|---|
| 3,162,834 | 12/1964 | Schweighofer et al. | 73/178 R |
| 3,564,890 | 2/1971 | Catapano | 73/178 R |

Primary Examiner—Donald O. Woodiel

[57] ABSTRACT

An evolutionary development of my prior inventions into an improved display form, more compatible to the desires of the overwhelming majority of pilots. This new invention is a natural derivative of my (co-pending application for patent, Ser. No. 629,850, file date July 11, 1984 for Bank and Pitch Indicator) and (co-pending application for patent, file number pending, file date Mar. 25, 1985 for Improved Pitch Indicator for Bank And Pitch Indicator). This new display will be composed of a display face disc, such disc will rotate in unison with the gimbal cage of a rate gyro, gyro deflective sensitivity being airspeed compensated if desired, wherein the display face disc will possess a rectangular window, whereby, a rotating drum display will show thru the window, such display will provide the pilot with a horizon reference demarcation line, painted blue sky above the line, painted black earth below the line and also short definition lines, above and below, showing five, ten, fifteen and twenty degree angle of attack deviation above or below the demarcation line, wherein by comparative reference to an aircraft tail view silhouette etched into the face plate glass, the pilot may easily determine his pitch reference with relation to the relative airstream. The aircraft will be provided with an angle of attack vane, wherein, the rotating drum of the instrument display will rotate in unison with and proportionally to the angular deflection of the angle of attack vane, such deflection being responsive to the relative airstream. The drum centerline axis will also rotate in unison with the gimbal cage, whereby, the horizon reference demarcation line will display to the pilot both bank and pitch by comparative reference to the etched silhouette and will show on or deviation therefrom. This new instrument is by far more trustworthy than a gyro horizon due to complete basic non-tumbling, non-drifting reference, totally immune of earth reference requirement.

4 Claims, 7 Drawing Figures

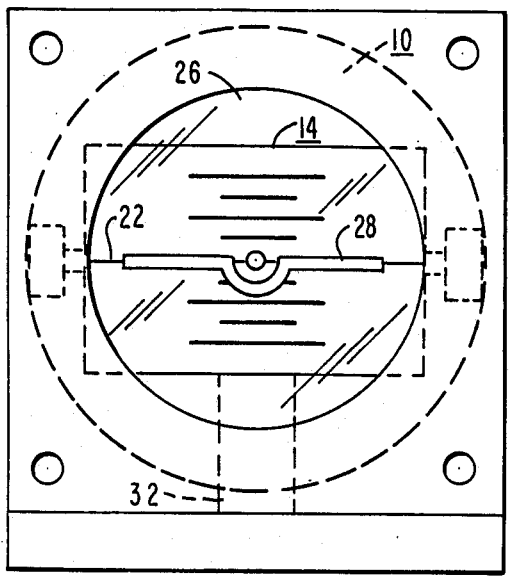
FIG. 4
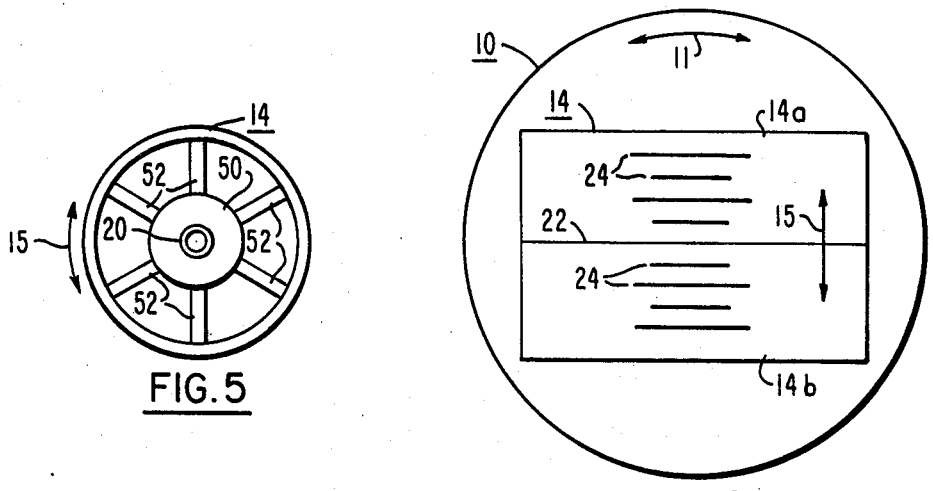
FIG. 5
FIG. 6
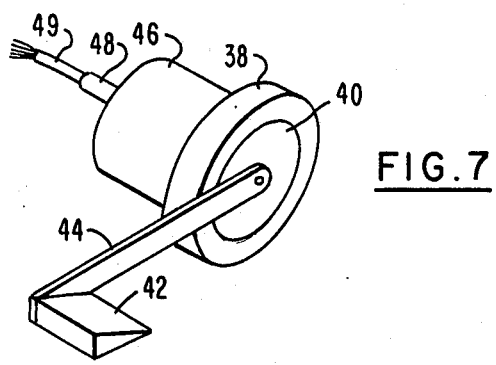
FIG. 7

TRUSTWORTHY BANK AND ANGLE OF ATTACK INDICATOR

BACKGROUND OF THE INVENTION

The need for trustworthy flight instruments has long been recognized, likewise, the fallacies of earth reference gyro systems has equally been recognized. In concert with this recognition and in accord with prior work in this area, this new invention is yet another attempt to further improve the integrity of display given to the pilot. This new assembly of components is obviously a step forward in this regard. By system simplification and basic derived reference, non-drifting, non-tumbling, absolute immunity to free drift, immunity to earth erection requirement and instantaneous correction of all induced errors, we obviously derive a highly dependable system. Another advantage to this system is low cost due to system simplification and reduction of moving parts. This new invention has evolved and is a natural derivative of prior disclosures of co-pending applications for patent predescribed in the ABSTRACT OF THE INVENTION in this disclosure.

DRAWINGS

FIG. 1 portrays an oblique view of the instrument assembly, the rate gyro, windowed display face disc, display indicator drum and appended gimbal cage as a unit.

FIG. 2 portrays a side view of the instrument assembly.

FIG. 3 portrays a top view of the instrument assembly.

FIG. 4 portrays a front view of the instrument assembly behind its face glass and bezel.

FIG. 5 portrays a slaved Synchro Servo unit, an indicator drum and supporting pylons as a unit.

FIG. 6 portrays a front view of the display face disc, its rectangular window and rotating drum indicator.

FIG. 7 portrays an angle of attack vane, its appended master Synchro Servo unit in combination therewith, wherein the entire unit will be responsive to the relative airstream passing over the surface of the vane.

DETAILED DESCRIPTION OF THE INVENTION

Figure 1:
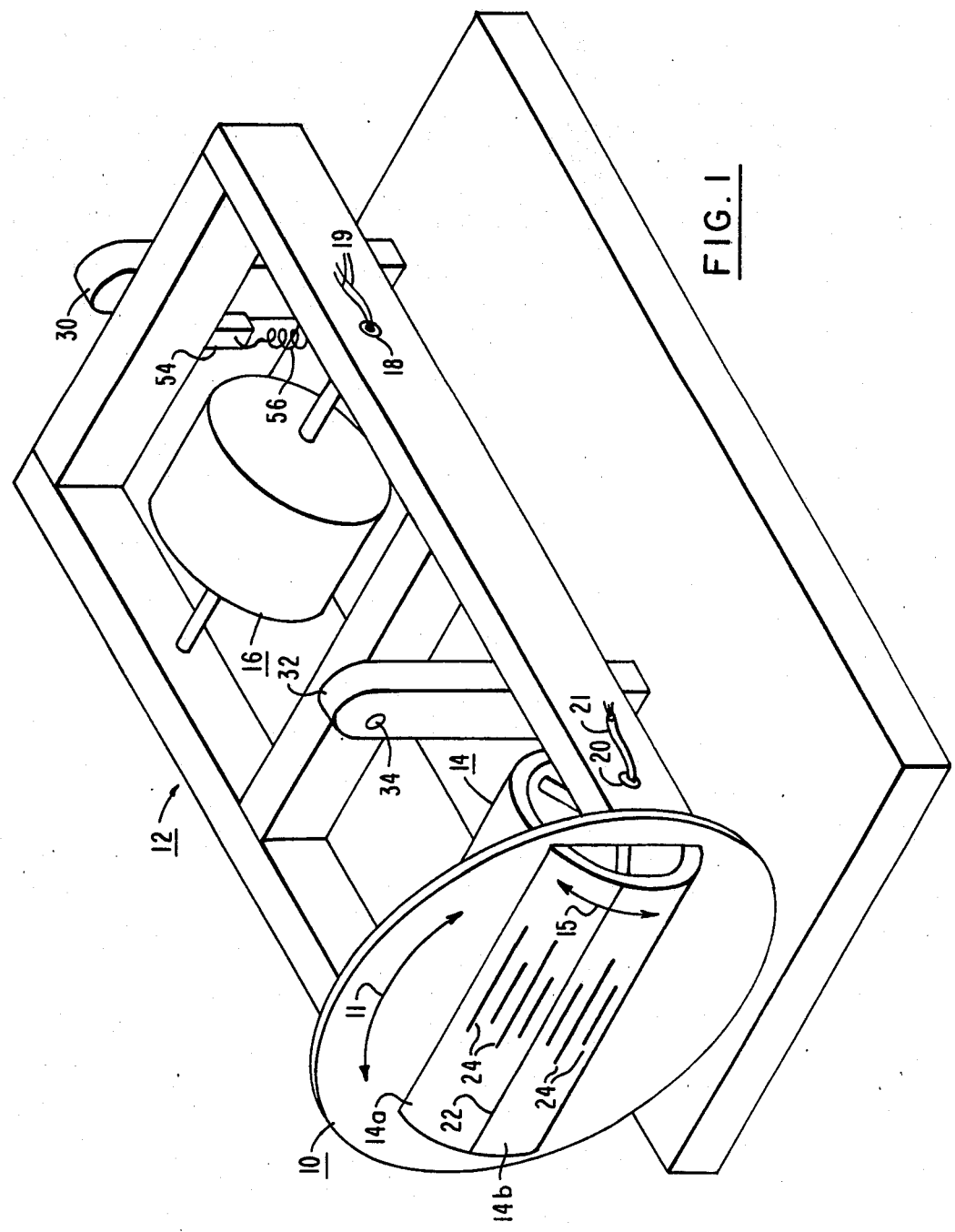
Figure 2:
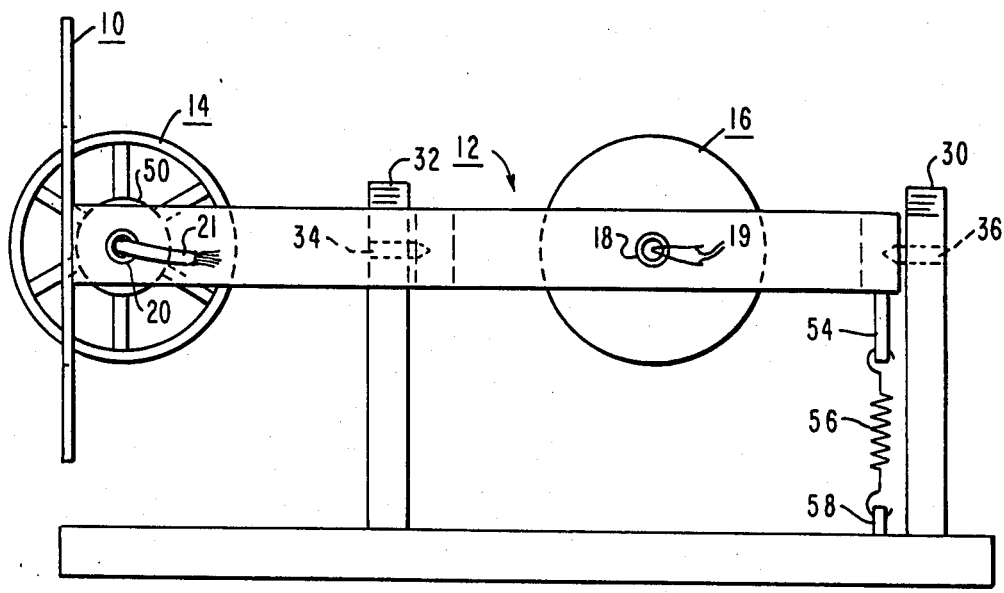
Figure 3:
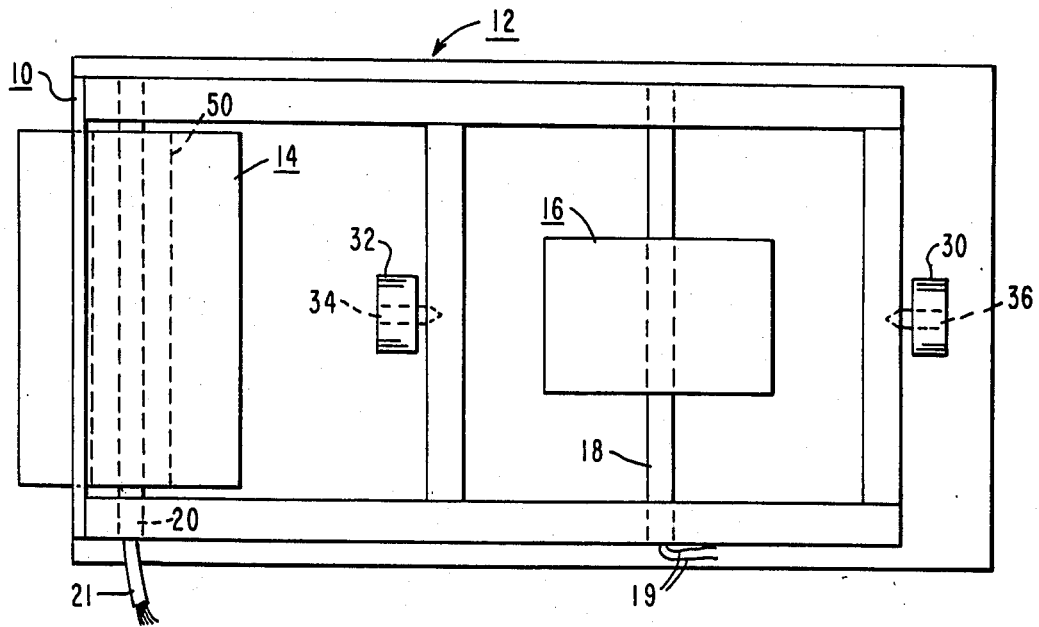

Referring to FIG. 1, we see a basic flight instrument to be provided to the pilot of an aircraft wherein he will view disc face 10 and rotatable drum 14, wherein, as a unit, they will rotate clockwise and counterclockwise as shown by arrows 11, in response to the intensity of precession encountered during turns of the craft, the directional rotation being opposite to the direction of the turn, whereby the horizon demarcation line 22 will show the approximate lateral reference, such reference being more true if the gyro is airspeed compensated as prescribed by my co-pending application for patent, Ser. No. 629850, file date July 11, 1984 for (BANK AND PITCH INDICATOR). Disc 10 and drum 14 are fixably attached to gimbal cage 12 wherein they will rotate in response thereto, such cage rotation being responsive to the encounter of intensity of precession, provided by rate gyro 16, during turn encounter, such gyro spinning upon shaft 18, spin force provided by electrical power thru wires 19 to the electrical motor of gyro 16. Gimbal cage 12 will be supported by support stanchions 30 and 32 and will pivot upon pivots 34 and 36 as shown in FIG. 2. It will be understood but not shown that gimbal cage 12 will be restricted to a maximum deflection of 45 degrees each side of center line, such deflection restriction insured by limit stops, (NOT SHOWN), proper erection of rate gyro 16 is guaranteed by erection spring 56 attached to gimbal cage arm 54 and gyro case tab 58. Drum 14 will rotate about its shaft 20 in response to and in accordance with movement of the angle of attack vane 42 FIG. 7. Vane 42 will be responsive to the relative airstream and will show longitudinally level or angular deviation therefrom. This response will be transmitted by means of a Master Synchro Servo unit 46 thru wiring bundle 49, thru connective wiring not shown, into wiring bundle 21, thru hollow axle shaft 20 to feed controlling power to a Slave Synchro Servo unit 50 FIG. 5, which will cause Drum 14 to rotate proportionally thereto as drum 14 is secured to the outer stator case of Slave Synchro Servo unit 50, by means of support pylons 52. FIG. 2 is a side view of the BANK AND ANGLE OF ATTACK INDICATOR, the parts thereof predescribed. FIG. 3 is a top view of the BANK AND ANGLE OF ATTACK INDICATOR and likewise all indicated parts are predescribed. FIG. 4 is a front view of the BANK AND ANGLE OF ATTACK INDICATOR portraying its glass cover face 26, etched aircraft rear view silhouette 28, Horizon demarcation line 22, stanchion support 32 and disc face 10. FIG. 5 and FIG. 6 element parts predescribed with the exception of pitch reference lines 24. FIG. 7 portrays the angle of attack vane 42, arm 44, rotating disc plate 40, mounting plate 38, Master Synchro Servo 46, hollow shaft 48 and wire bundle 49.

OPERATION

Referring to FIG. 2, we see a gyro 16 which will rotate about its axle shaft 18 in a clockwise direction to insure proper response deflection of gimbal cage 12. Note: Normal reversing system of the rate gyro has been removed, reversing system being common to the state of the art. If by chance, gyro rotor 16 is rotating in the opposite direction, this will require that the gyro axle shaft be reversed (swapped end for end) to insure proper orientation so as to guarantee proper response. Proper orientation will insure that disc 10 will properly respond, disc 10 will rotate clockwise during a left hand turn, and counterclockwise during a right hand turn, reference arrows 11 FIG. 6 and FIG. 1. Gimbal cage 12 will be maintained in proper erection by a common centering spring 56, attached to gimbal cage arm 54 and case tab 58. The cage 12 will have deflective freedom of movement of 45 degrees each side of centerline, limited from further movement by limit stops (not shown) such stops will provide shock absorption as is common to the state of the art. Gimbal cage 12 is held in place by stanchions 30 and 32 and will pivot on pivots 34 and 36. Gyro 16 will receive electrical power thru wires 19 entering thru hollow axle shaft 18 as is common to the state of the art. Indicator drum 14 will rotate about its hollow axle shaft 20, such shaft will be supported by gimbal cage 12 and physically clamped thereto. Drum 14 will show thru a rectangular window provided in display disc 10 FIG. 6. Drum 14 will be electrically slaved to angle of attack vane 42, therefore responsive thereto. Referring to FIG. 7 we see an angle of attack vane 42, its arm 44, said arm 44 is secured to rotating plate 40, attached to plate 40 is the Master Synchro Servo, wherein, its entire stator case will rotate with plate 40 as a unit. Hollow Servo shaft 48 will be prevented from rotation by a clamp (not shown), such clamp being secured to the airframe structure of the aircraft. Support plate 38 will likewise be attached to the airframe, for mounting of the vane. Wire bundle 49 will feed power into Slave Synchro Servo 50, by means of wire bundle 21 thru hollow axle shaft 20, connective wiring and power feed between the Master unit and its respective Slave unit is not shown as this is state of the art. Obviously vane 42 FIG. 7, will be responsive to the angle of the relative airstream flowing past the aircraft, therefore, stator case 46 will likewise be responsive, thereby, by means of interconnective electrical wiring, the stator case of slave unit 50 will also be responsive and proportional thereto. It is required that for proper operation case 50 must rotate in a direction the exact opposite to the rotation of case 46. If by chance it is rotating the same direction, it will require that the axle shaft 20 be swapped end for end. Vane 42 FIG. 7 will raise and lower with changes of angle of attack of the aircraft, horizon demarcation line 22, FIG. 1, FIG. 4 and FIG. 6, will be responsive thereto, proportionally, but in an exact opposite manner, wherein, during nose pitch up, vane 42 will raise, thereby horizon demarcation line 22 will lower and should the nose of the aircraft pitch down, the exact opposite will occur, vane 42 will lower and demarcation line 22 will raise. The reverse proportional response will be achieved by a Master Synchro Servo and a Slave Synchro Servo as was predescribed. By comparative reference of aircraft tail view silhouette 28 FIG. 4 with relation to horizon demarcation line 22 and or pitch reference lines 24 FIG. 6, of drum display 14, the pilot may determine his pitch angle to the relative airstream and his approximate bank angle. Integrity of the bank angle display may be improved by airspeed compensation of the gyro as predescribed in my co-pending application for patent, Ser. No. 629,850, file date July 11, 1984 for Bank and Pitch Indicator, if such improvement is deemed necessary as may be the case should the aircraft have a wide variation of speed capability. Note: Silhouette 28 will be etched onto the inner surface of cover glass 26 as shown FIG. 4. Enhancement of the display will be provided by blue sky coloration 14a above horizon demarcation line 22 and black earth coloration 14b below demarcation line 22, as is common to the state of the art.

What I claim:

1. An aircraft instrument for the simultaneous determination of roll and pitch, said instrument comprising an aircraft rear view silhouette, said silhouette being etched onto the inner surface of the instrument cover glass, wherein, said silhouette will be used for comparative reference to a sky earth demarcation line, sky color above, earth color below, wherein, said demarcation line will be roll responsive to a rate gyro and pitch responsive to an angle of attack vane, said responses being simultaneous, wherein, the demarcation line and adjacent sky earth coloration will be painted upon the outer surface of a display drum, inner surface of said drum being fixably secured to the outer surface of a receiver synchro servo, wherein, the axle shaft of said receiver servo will be fixably clamped to the extended side rails of said rate gyro, apparatus further comprising a transmitter synchro servo, said transmitter servo fixably secured to an angle of attack vane, said vane located within the relative airstream, whereby, should the angle of attack of the aircraft change relative to said airstream, attached transmitter servo will be responsive thereto, the receiver servo will likewise be responsive by means of electrical cable interconnect, whereby said drum will rotate about the receiver servo axis in response to changes of angle of attack thereby providing indications of pitch, said drum will also possess lateral freedom of rotation, wherein, axle shaft of said receiver servo will be responsive to rate gyro deflection thereby providing indications of roll, wherein a pilot by reference to said instrument may determine his or her flight situation with regard to said roll and pitch.

2. Apparatus in accordance with claim 1, wherein, servos will comprise of either autosyn or selsyn transmitters and receivers but not restricted thereto.

3. In accordance with claim 1, apparatus further comprising a display face masking disk, said disk possessing a rectangular window, said window being a sighting hole for the viewing of the indicator drum, wherein, said disk will provide cosmetic enhancement for said drum display.

4. In accordance with claim 1, apparatus comprising transmitter and receiver synchro servos, said servos electrically interconnected, wherein, rotational orientation of said servos will be such that the indicator drum will rotate in a direction opposite to that of the angle of attack vane as laterally viewed from either side.

* * * * *